United States Patent [19]
Waters

[11] 3,902,547
[45] *Sept. 2, 1975

[54] PERMAFROST STRUCTURAL SUPPORT WITH COMPATIBLE HEAT PIPE MEANS

[75] Inventor: Elmer D. Waters, Richland, Wash.

[73] Assignee: McDonnell Douglas Corporation, Santa Monica, Calif.

[ * ] Notice: The portion of the term of this patent subsequent to Aug. 13, 1991, has been disclaimed.

[22] Filed: Apr. 24, 1974

[21] Appl. No.: 463,519

Related U.S. Application Data

[60] Division of Ser. No. 346,622, Mar. 30, 1973, Pat. No. 3,828,845, which is a continuation-in-part of Ser. No. 174,687, Aug. 25, 1971, Pat. No. 3,788,389.

[52] U.S. Cl. .............. 165/45; 165/105; 165/185; 165/106
[51] Int. Cl. .......................... F28d 15/00
[58] Field of Search ............ 165/45, 105, 164, 185, 165/106

[56] References Cited
UNITED STATES PATENTS

| | | | |
|---|---|---|---|
| 3,217,791 | 11/1965 | Long | 165/105 X |
| 3,274,769 | 9/1966 | Reynolds | 60/641 |
| 3,470,943 | 10/1969 | Van Huisen | 60/641 X |
| 3,764,765 | 10/1973 | Olashaw | 165/105 X |
| 3,828,845 | 8/1974 | Waters | 165/45 |

*Primary Examiner*—Albert W. Davis, Jr.
*Attorney, Agent, or Firm*—D. N. Jeu; Walter J. Jason; Donald L. Royer

[57] ABSTRACT

Structural support assembly for use in arctic and subarctic (permafrost) areas or in any areas where the upper ground layer is subject to a severe annual freeze-thaw cycle, including the cooperative combination of a support structure and a heat pipe element installed in generally frozen soil. The heat pipe is of a suitably complementary configuration and/or disposition with respect to the support structure to provide appropriate stabilization of the surrounding frozen soil. In one embodiment, the heat pipe element is disposed externally of the support structure and, in another embodiment, it is disposed internally of such structure. The external embodiment further includes one version employing a linear (straight) heat pipe element and another version employing an angular (helical) element. The internal embodiment further includes one version wherein a heat pipe is integrally combined with a support structure and another version wherein a heat pipe is cooperatively installed inside a support structure.

7 Claims, 15 Drawing Figures

PERMAFROST STRUCTURAL SUPPORT WITH COMPATIBLE HEAT PIPE MEANS

CROSS-REFERENCE TO RELATED APPLICATION

This is a division of application Ser. No. 346,622 filed Mar. 30, 1973, now U.S. Pat. No. 3,828,845, which is a continuation-in-part of application Ser. No. 174,687 filed Aug. 25, 1971, now U.S. Pat. No. 3,788,389.

BACKGROUND OF THE INVENTION

My invention relates generally to support structures and, more particularly, to a movel and useful structrual support assembly for use in permafrost areas or in any areas having active ground layers subject to a severe annual freeze-thaw cycle.

Permafrostis material which is largely frozen permanently. It is usually a mixture of soil, rock and ice although it can be anything from solid rock to muddy ice. In the arctic regions, permafrost may extend from a few feet to hundreds of feet below the surface. The permafrost is separated from the surface by an upper layer (the tundra) and its surface vegetation. The upper layer or tundra serves as insulation to limit permafrost thaw in the summer but is subject to a seasonal freeze-thaw cycle. The permafrost thaw in the summer, however, can create an unstable condition for structures constructed in permafrost areas. This is, of course, more so in wet, ice-rich, permafrost areas than in dry, stable permafrost areas of well drained soil or rock.

There are severe problems associated with support and stabilization of structures in the arctic regions where permafrost is prevalent. Alaskan railroads, for example, require the expenditure of thousands of dollars each year to repair soil slippages and track roughness resulting from the annual freeze-thaw cycle and disturbances of the ground cover by the intrusion of man and his machines. when the tundra is broken or removed, the permafrost loses its insulation and begins to melt and erode. Thus, tracks left by a tractor or caterpillar train can become a deep ditch and alter the surface drainage pattern over a wide area.

In cities and regions which overlay permafrost areas, a gravel insulating technique is generally used in construction over such areas. A raised gravel pad, for example, is ordinarily employed to provide a suitable support or work area on permafrost. Foundation structures embedded in permafrost are also commonly surrounded completely by a layer of insulating gravel. In areas of ice-rich permafrost and/or during a strong summer thaw, however, even the use of a relatively thick insulating gravel layer is inadequate to prevent some subsidence and possibly accompanying damage of the supported structure or apparatus. On the other hand, instead of subsiding, support posts or poles for arctic overhead communications and power lines have presented a particular probelm with "pole jacking" wherein the annual seasonal uplift due to frost heave can actually lift the poles and their anchors completely out of the ground. The pole jacking problem has plagued all of the utility companies throughout vast areas of the subarctic regions, and is presently considered to have no reasonable economic solution.

The U.S. Pat. No. 3,217,791 of Erwin L. Long on Means for Maintaining permafrost Foundations patented Nov. 16, 1965 discloses and claims a thermovalve foundation system including a closed tubular container partially filled with a low boiling point liquid, eigher propane or carbon dioxide, and a layer of gravel completely surrounding its lower portion. The thermovalve tubular container operates during periods of subfreezing temperatures to absorb heat from the adjoining permafrost, to freeze the adjacent unfrozen soil and increase its strength of adhesion to the foundation. The container itself serves as a foundation piling or support pole which is used with a gravel layer completely surrounding its lower portion. It is, however, not only costly but frequently impractical and infeasible to provide a sufficiently large and thick insulating gravel layer entirely around and below the lower portion of each pole to stabilize it. Moreover, the metallic tubular container itself of the thermo-valve system is obviously limited by practical considerations in height or length and location whereas a wooden utility pole of any substantial height or length can be economically used in any location.

SUMMARY OF THE INVENTION

Briefly, and in general terms, my invention is preferably accomplished by providing a structural support assembly for use in arctic, subarctic and similar regions, including a cooperative combination of a support structure and a heat pipe element, which can be directly and easily installed in generally frozen soil to provide a stable support for various apparatus and structures. The heat pipe element is of a suitably complementary configuration and/or disposition with respect to the support structure to provide appropriate stabilization of the surrounding frozen soil.

Where the support structure is of the form of a wooden utility pole, for example, the heat pipe element can be of either a linear (straight) configuration or an angular (helical) one positioned adjacent to the surface of the lower embedded portion of the pole. Both straight and helical elements extend at least over the embedded length of their respective poles and protrude a predetermined distance linearly above the ground for heat exchange purposes. The heat pipe element broadly includes an elongated tubular container having a filling or charge of a suitable working fluid, and a heat exchanger (radiator) suitably coupled or integrally incorporated with the protruding upper portion of the tubular container. Means for attaching the lower embedded portion of the tubular container to the surface of the pole can be utilized where desired or required.

Each of the straight and helical heat pipe elements can be fabricated in a two-part assembly wherein the upper radiator section, located above the ground, can be readily separated and detached from the lower embedded section. In this instance, the upper and lower heat pipe sections are secured together in an overlapping joint. Heat transfer between the two parts is facilitated by, for example, a thermal paste used between the contiguous faces of the joined parts. While the heat removal rate with the two-part assembly is about 12 percent less than with a one-part assembly, the two-part assembly permits easy replacement of a radiator that may be damaged by large animals (migrating caribou, bears, etc.) or by vandalism.

Where a wooden pole or piling cannot be used or is not desired, advantage can be taken of an integrally combined metallic support structure and heat pipe element assembly. This sturctural support assembly includes a closed, elongated, tubular container having a filling or charge of a suitable working fluid, a helical wall fin protruding radially inwards from the internal surface of the tubular container, and a heat exchanger (radiator) suitably coupled or integrally incorporated with the upper portion of the tubular container. The lower portion of the tubular container is installed directly in permafrost to a depth such that the upper radiator portion is positioned above the ground with its upper end located at a desired height to provvide support for associated apparatus or structure.

Where the support structure is a hollow metallic pile, the lower portion of heat pipe element can be generally installed linearly (or angularly) inside of the pile which is then filled with a good heat transfer medium. A filler liquid such as kerosene can be used to fill the pile if it is closed or sealed at its lower end or bottom and is not leaky. If, however, the pile is leaky or is open at the bottom, a suitable slurry of soil and water or sand and water can be used to fill the pile. The heat pipe element installed in the hollow metallic pile is an elongated tubular container including a relatively small quantity of a suitable working fluid therein. A heat exchanger (radiator) is suitably coupled to the upper portion of the tubular container extending normally above and outside of the pile. The lower portion of the tubular container has at least one longitudinal, heat transferring, fin or flange affixed thereto and extending laterally or radially therefrom. Preferably, two such fins are diametrically affixed to the lower portion of the tubular container to provide an axially symmetrical member which can be easily bent (perpendicularly to the plane of the fins) as required. Flow or wick means can be included under certain conditions in the lower portion of the tubular container for generally directed and distributing fluid condensate flow therein.

BRIEF DESCRIPTION OF THE DRAWINGS

My invention will be more fully understood, and other features and advantages thereof will become apparent, from the following description of certain exemplary embodiments of the invention. The description is to be taken in conjunction with the accompanying drawings, in FIG. 1 is a front elevational view, shown partially in section and in simplified form, of a test installation of different poles including control poles and those constructed according to this invention;

FIG. 3 is a fragmentary sectional view of a lower part of the linear heat pipe element as taken along the line 3—3 indicated in FIG. 2;

DESCRIPTION OF THE PRESENT EMBODIMENTS

In the accompanying drawings and following description of certain embodiments of my invention, some specific dimensions and types of materials are disclosed. It is to be understood, of course, that such dimensions and types of materials are given as examples only and are not intended to limit the scope of this invention in any manner.

Figure 1:
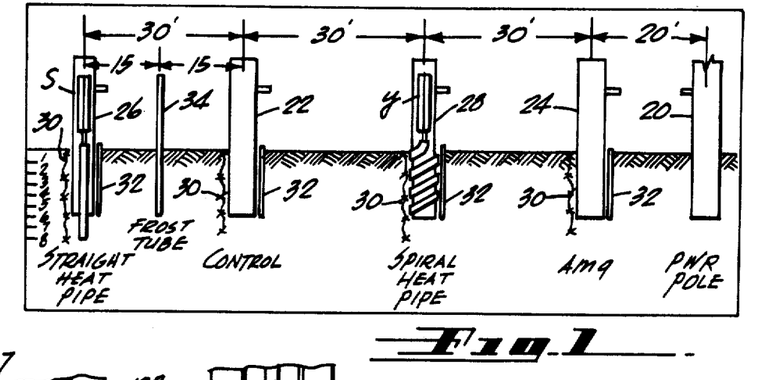

FIG. 1 is a front elevational view, shown partially in section and in simplified form, of a test installation of a group of different poles including a regular power pole 20, a first control pole 22 set to simulate a typical utility pole installation, a second control pole 24 set with a type AM-9 chemical grout solution added to the backfill around the pole base, a utility pole 26 with a linear heat pipe element S attached to its lower embedded portion, and another utility pole 28 with an angular heat pipe element y attached to its lower embedded portion. The purpose of the chemical grout solution used in the backfill of the control pole 24 was to prevent water migrtion to the soil-pole interface. For clarity of illustration, the heat pipe elements S and y have been shown in considerably simplified forms. The heat pipe poles 26 and 28 were installed on either side of the first control pole 22. The four poles 22, 24, 26 and 28 were installed to evaluate the magnitude of pole jacking and the preventive effects of the heat pipe elements S and y. The poles 22, 24, 26 and 28 were installed at 30 feet spacings in order that the poles can function independently but be comparable in movement. Thermocouples 30 and a frost tube 32 were installed adjacent to each pole for data comparison. A ground frost tube 34 was installed between the poles 22 and 26. A 24-inch auger unit was used to drill the installation holes and, as each hole was drilled, the ground conditions were observed and noted. In general, the test ground can be typified as peaty organic silt to a depth of two feet and clay silt to a depth of eight feet. The permafrost level was at a depth of approximately six feet.

Temperatures measured by the thermocouples 30 are suitably recorded and plotted. The frost tubes 32 suspend or permit the lowering therein of tranparent containers of a (liquid) substance which gradually changes from a green to red color as it changes from an unfrozen to frozen condition. This, the frost tubes 32 provide or permit the obtaining of visual indications of the (unfrozen or frozen) conditions of the soil adjacent to the poles 22, 24, 26 and 28. The ground frost tube 34 was used to provide or permit the obtaining of information on the extent of ground freezing between the poles 22 and 26.

The heat pipe elements S and y are designed especially to cause rapid freezing of the soil around a utility pole in a radical direction along the full embedded pole portion so that the pole is firmly anchored from the ground surface into the permafrost. Water migration and frost heave due to progressive freezing and adhesion to the pole from the ground surface downward are thus precluded. Since soil expansion occurs in the radial direction, the vertical forces acting on the pole are minimized. Of course, unfrozen soil can accommodate the radial expansion, and there are no appreciable detrimental forces acting to damage a heat pipe element in the ground.

The primary measure of pole jacking is vertical movement throughout the year. Test results showed that the existing power pole 20 and its brace rose at a relatively rapid rate. Similarly, the plots for the first and second control poles 22 and 24 also showed that both moved upward at comparable rates. Of interest, the second control pole 24 with chemical grout added to its backfill, rose at a greater rate than any other pole. The pole 24 and stabilized soil surrounding it were apparently being jacked as a single unit. The poles 26 and 28 with their respective linear and angular heat pipe elements S and y, however, did not establish any difinite trend of movement during the same period of time and the heat pipes definitely developed a full jacket of frozen soil around their poles from the ground surface to the permafrost. It appeared that this jacket is strong enough to prevent any future upward heave.

Also, the helical heat pipe element y definitely cooled the ground more rapidly than the straight heat pipe element S and created a large frost jacket around its pole 28 but this additional freezing (above that offered by the straight heat pipe element) did not appear necessary to obtain an adequate frost anchor effective the year around. One linear element S appears to be adequate to anchor its pole 26 having a diameter of approximately 12 inches. For substantially larger diameter poles, two or more linear elements can be attached equiangularly spaced circumferentially about such poles. Alternatively, a single angular element y can be used instead on very large diameter poles.

Figure 2:
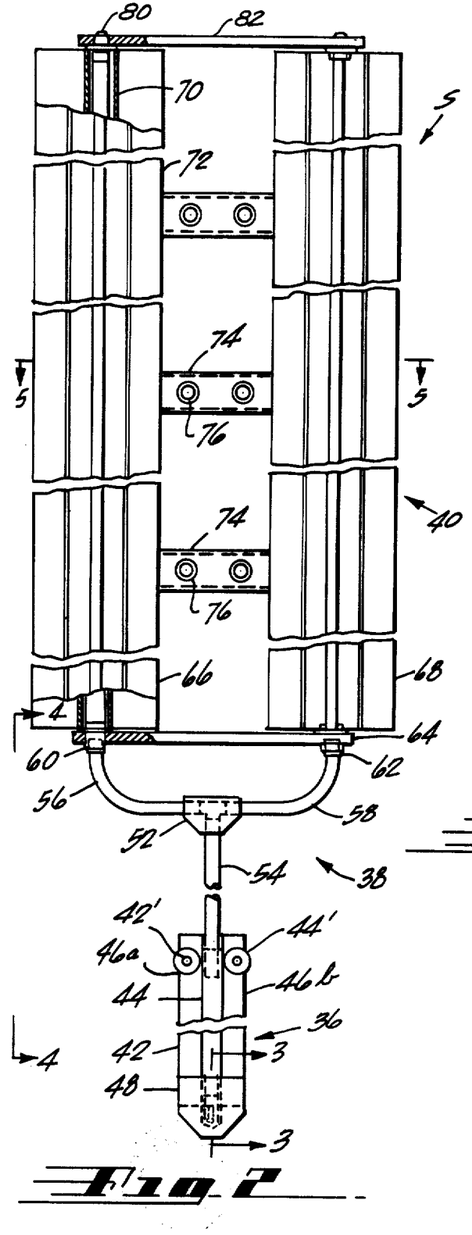
FIG. 2 is a front elevational view, shown partially in section and in fragments, of a linear (straight) heat pipe element that is normally attached to a wooden utility pole to stabilize the surrounding permafrost in which it is installed.

FIG. 2 is a front elevational view, shown partially in section and in fragments, of the linear heat pipe element S which is normally attached to the wooden utility pole 26 (FIG. 1). The heat pipe element S generally includes a lower embedded portion 36, a central connecting tee portion 38, and an upper heat exchanger (radiator) portion 40. The lower portion 36 is preferably fabricated largely of a tubular (aluminum) extrusion 42 having a central bulbous tube 44 and side flanges or fins 46a and 46b. The lower portion 36 is, for example, about 96 inches long and can be conveniently fastened to the pole 26 by nails 42' and washers 44' located near the ends of flanges 46a and 46b, and at spacings of approximately 12 inches between the ends. The tube 44 has a circular inner diameter nominally of one-half inch, and is suitably sealed and covered by a cap 48 at its lower end. With an aluminum extrusion 42, selection and use of a suitable means of corrosion protection such as galvanic protection, for example, the sacrificial washers 44', or surface coating protection (organic film of chemical conversion film) is normally required. A conventional wall screen (wire mesh) wick is not used in the heat pipe element S although such means may be preferrably used in the lower embedded portion 36 when it is very lonng (in one instance, 40 feet, for example).

FIG. 3 is a fragmentary sectional view of the lower end of the lower portion 36 of the linear heat pipe element S as taken along the line 3—3 indicated in FIG. 2. A standard pinch-off end plug 50 is welded to the lower end of the tube 44. The heat pipe element S can be suitably loaded with a working fluid such as ammonia through the end plug 50, and then closed by pinch-off and seal welding. Approximately 48 grams of ammonia is used, for example, in this illustrative embodiment. The end plug 50 is covered by cap 48 which can be secured by epoxy cement to the lower end of the extrusion 42. Of course, any other suitable form of protective cover for the pinch-off and weld can be used.

Figure 4:
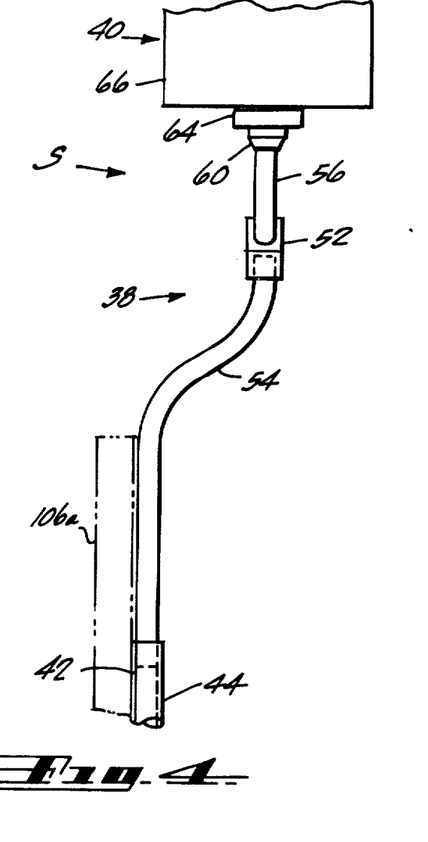
FIG. 4 is a side elevational view of a central part of the linear heat pipe element as taken along the line 4—4 indicated in FIG. 2.

FIG. 4 is a side elevational view of the central connecting tee portion 38 of the linear heat pipe element S as taken along the line 4—4 indicated in FIG. 2. Referring to both FIGS. 2 and 4, it can be seen that the upper end of the tube 44 of extrusion 42 is joined to the lower end of the upper heat exchanger portion 40 by the central portion 38. This central portion 38 includes a tee 52, a lower tube 54, and left and right upper tubes 56 and 58. The ends of the lower tube 54 extend approximately one-half inch into the upper end of the tube 44 and lower passageway of tee 52, respectively, and are welded thereto. Similarly, the upper left and right tubes 56 and 58 connect the left and right passageways of the tee 52 respectively to the lower ends of adapter plugs 60 and 62 mounted in left and right holes of a bottom support strap 64 as shown in FIG. 2. The upper ends of the hollow adapter plugs 60 and 62 are welded respectively to the lower tubular ends of passave radiators 66 and 68 of the upper heat exchanger portion 40. While two radiators 66 and 68 have been shown, only one or more than two radiators can be appropriately used.

Figure 5:
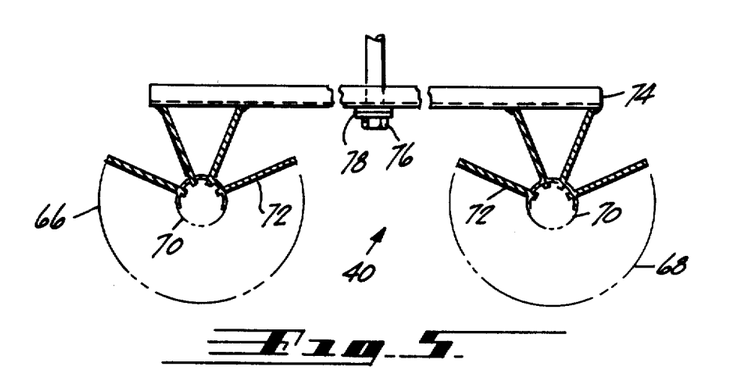
FIG. 5 is a cross sectional view of an upper part of the linear heat pipe element as taken along the line 5—5 indicated in FIG. 2.

FIG. 5 is a cross sectional view of the radiators 66 and 68 of the upper portion 40, as taken along the line 5—5 indicated in FIG. 2. Referring jointly to FIGS. 2 and 5, it can be seen that each of the radiaters 66 and 68 includes a central tubular body 70 and a plurality of radial fins 72. The fins 72 are circumferentially spaced equiangularly and protrude a slight distance (0.15 inch, for example) radially into the tubular body 70 is indicated in FIG. 5. Two of the fins 72 of each radiator 66 and 68 are welded at their ends to channel members 74 which are, in turn, fastened to the utility pole 26 (FIG. 1) by lag screws 76 and washers 78. The upper end of the tubular body 70 of each of the radiators 66 and 68 is closed by a solid end plug 80 and sealed by welding. The upper ends of the plugs 80 of the radiators 66 and 68 are respectively mounted in left and right holes of a top support strap 82 as shown in FIG. 2. The tubular body 70 is approximately 1 inch in diameter, and the fins 72 are approximately 2 inches wide and 72 inches long, for example. Obviously, other techniques of attaching the radiators to the pole for support can be used, especially when only one radiator is employed.

Figure 6:
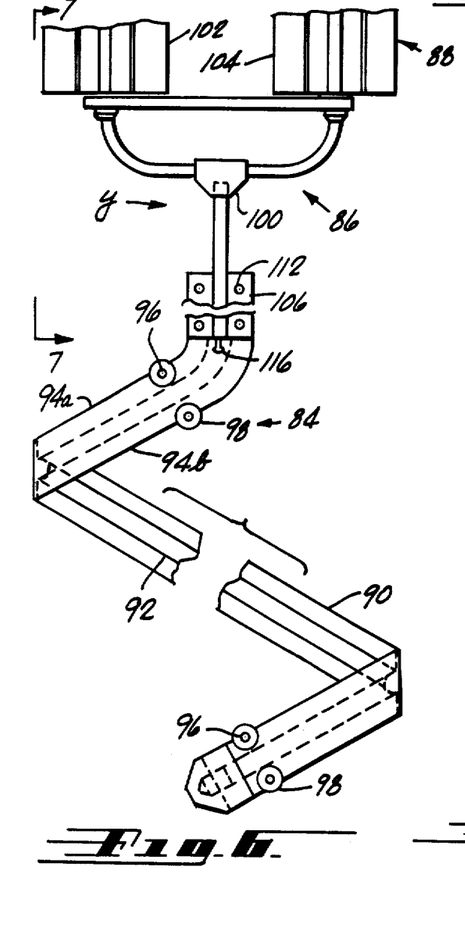
FIG. 6 is a front elevational view, fragmentarily shown, of an angular (helical) heat pipe element that is normally attached to a wooden utility pole to stabilize the surrounding permafrost in which it is installed.

FIG. 6 is a front elevational view, fragmentarily shown, of the angular (helical) heat pipe element $y$ which is normally attached to the wooden utility pole 28 (FIG. 1). The heat pipe element $y$ generally includes a lower embedded portion 84, a central connecting joint and tee portion 86, and an upper heat exchanger (radiator) portion 88. The lower portion 84 is fabricated largely of a tubular (aluminum) extrusion 90 having a central bulbous tube 92 and side flanges or fins 94a and 94b. The tube 92 protrudes radially inwards from the flanges 94a and 94b, and the inner diameter of each coil is approximately 12.50 inches, to accommodate a utility pole 12 inches in diameter. The lower portion 84 can be, for example, about 72 to 96 inches long between the ends of the coiled section, with six equally spaced coils or a nominal 12 to 16 inches lead per coil. The deeper that the pole 28 and its element $y$ are embedded in the ground, the less can be the number of coils since a deeper embedded length tends to offset the lifting of the pole.

The lower portion 84 can be conveniently fastened to the pole 28 by nails 96 and washers 98 located near the ends of the coiled section along the flanges 94a and 94b, and at spacings of approximately 12 inches along the longitudinal length thereof. The lower end of the extrusion 90 of the lower portion 84 is sealed and capped in the same manner as in the linear heat pipe element S. The tee 100 and everything above it, including the heat exchanger portion 88 and its left and right radiators 102 and 104, can be identical to the tee 52 and heat exchanger portion 40 and its radiators 66 and 68 of the linear heat pipe element S. The central portion 86 of the angular heat pipe element $y$ includes an overlapping joint 106 which is not used in the central portion 38 of the linear heat pipe element S. It is noted, however, that a similar overlapping joint 106a (indicated in phantom lines in FIG. 4) can be readily incorporated and used in the linear heat pipe element S, if desired or required.

Figure 7:
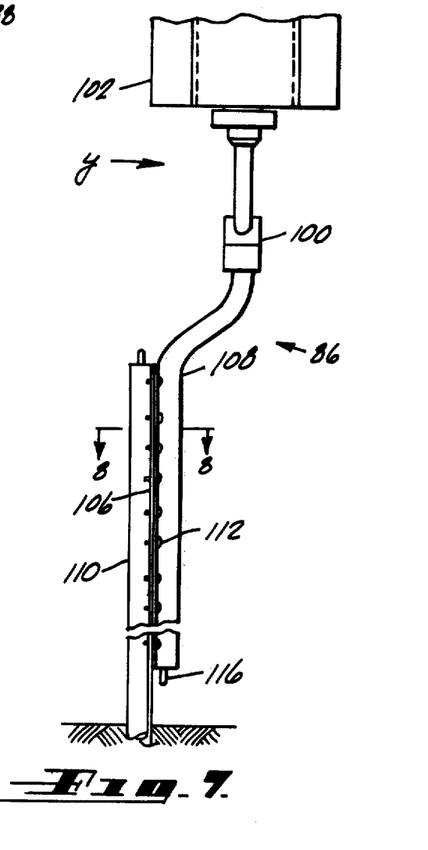
FIG. 7 is a side elevational view of a central part of the angular heat pipe element as taken along the line 7—7 indicated in FIG. 6.

FIG. 7 is a side elevational view of the central portion 86 of the angular heat pipe element $y$, as taken along the line 7—7 indicated in FIG. 6. Referring to both FIGS. 6 and 7, it can be seen that the angular heat pipe element $y$ is essentially a two-part assembly of a separate upper heat pipe section 108 and a separate lower heat pipe section 110 which are thermally joined or connected together by the overlapping joint 106. Thus, the upper heat pipe section can be readily separated and detached from the lower heat pipe section, so that it can be replaced when damaged without having to dig up the entire pole 28 and replacing an entire heat pipe element because of damage only to the upper radiator portion thereof. The heat removal rate with the two-part assembly, as compared to a similar one-part assembly, is about 12% less than the latter.

Figures 7, 8, 9, 10, 11:
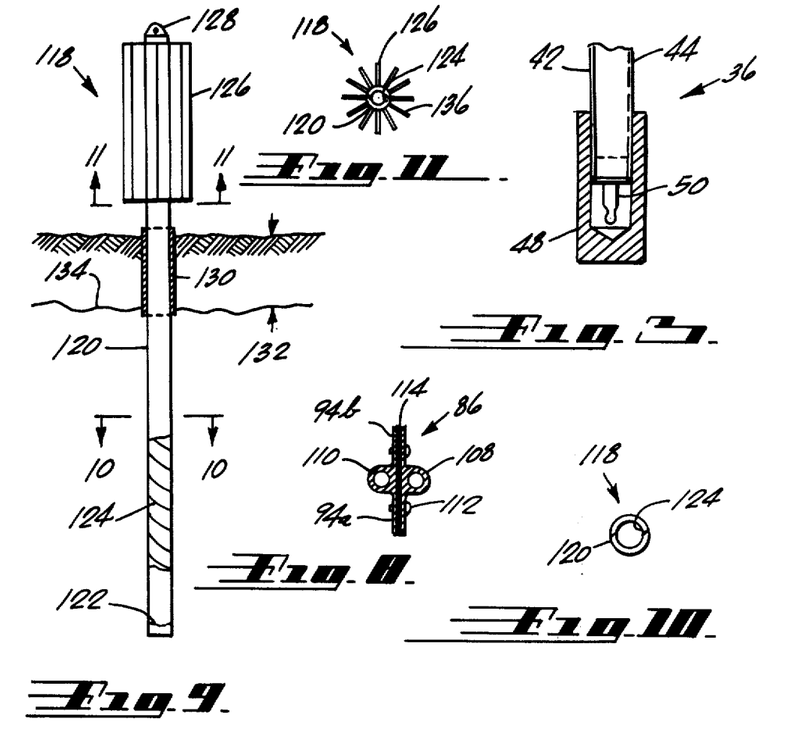
FIG. 8 is a cross sectional view of the central part of the angular heat pipe element as taken along the line 8—8 indicated in FIG. 7.
FIG. 9 is a front elevational view, shown partially broken away, of a structural support assembly wherein a heat pipe element is constructed to serve simultaneously as the support structure.
FIG. 10 is a cross sectional view of a lower part of the support assembly as taken along the line 10—10 indicated in FIG. 9.
FIG. 11 is a cross sectional view of an upper part of the support assembly as taken along the line 11—11 indicated in FIG. 9.

FIG. 8 is a cross sectional view of the central portion 86 of the angular heat pipe element $y$, as taken along the line 8—8 indicated in FIG. 7. Referring jointly to FIGS. 7 and 8, it can be seen that the flanges 94a and 94b of each tubular extrusion 90 of the upper and lower heat pipe sections 108 and 110 are fastened directly together by bolts 112 spaced along the lenth of the overlapping joint 106. A layer 114 of thermal paste (such as Dow Corning DC-340) can be used between the contiguous faces of the joined sections 108 and 110 to facilitate heat transfer between the sections. The length of the overlapping joint is, for example, approximately 2 feet. The lower end of the upper heat pipe section 108 and the upper end of the lower heat pipe section 110 are each closed by a pinch-off end plug 116. Ground level can be at a few inches or more below the end plug 116 of the upper heat pipe section 108.

FIG. 9 is a front elevational view, shown partially broken away, of a structural support assembly 118 wherein a heat pipe element is integrally combined with and constructed to serve simultaneously as a support structure. The assembly 118 includes a closed, elongated, tubular container 120 having a charge of a suitable working fluid (a small amount of liquid and remainder vapor) 122, a helical wall fin 124 protruding radially inwards a short distance from the internal surface of the tubular container, and a heat exchanger (ambient air radiator) 126 suitably coupled or integrally incorporated with the upper portion of the tubular container. The assembly 118 further includes a structural attachment means 128 located normally above radiator 126 although it can in certain applications be located on or below the radiator, and a layer 130 of thermal insulation applied in the annual freeze-thaw ground region or layer 132 (largely the tundra) about the tubular container 120.

FIG. 10 is a cross sectional view of a lower part of the support assembly 118 as taken along the line 10—10 indicated in FIG. 9. This lower part of the assembly 118 includes the lower portion of the tubular container 120 with its helical wall fin 124, and is embedded in permafrost 134. From FIGS. 9 and 10, it can be seen that as the condensate runs down the container 120 wall, the helical wall fin 124 ensures that the wall is wetted all the way around and down. The fin 124 can be a narrow strip helical coil insert, a small diameter spring wire insert or a fine helical screw thread tapped in the tubular container wall, for example, each with a suitable pitch (which can be variable along the container length) between turns. Alternatively, a conventional wall screen (wire mesh) wick can be provided on the circumferential wall surfaces of the tubular container 120. It is noted that a helial wall fin or wall screen wick is not used in the linear or angular heat pipe elements S and $y$ although such means can be used and may be desirable under certain conditions.

FIG. 11 is a cross sectional view of an upper part of the support assembly 118 as taken along the line 11—11 indicated in FIG. 9. It can be seen that the heat exchanger 126 is a passive radiator including a plurality of vertical fins 136 which extend radially from the upper portion of the tubular container 120 and are equiangularly spaced circumferentially thereabout. Heat transfer is by way of the surfaces of the fins 136 to the ambient air. The tubular container 120 contains a suitable working fluid 122 (such as ammonia) which normally exists as a small quantity of liquid at the bottom end of the container, with saturated vapor filling the remainder thereof. This heat pipe device is highly effective, and the heat transfer process is fully operational with temperature drops of less than 1°F in the working fluid 122.

Anytime that the (ambient air) radiator region of the tubular container 120 becomes slightly (less than 1°F) cooler than the lower portion of the container, some saturated vapor will condense in the radiator region, give up its latent heat and then return by gravity down the wall of the container to its lower end. The condensation of fluid 122 in the upper portion of the tubular container 120 tends to decrease the pressure in the container, causing more vapor to flow up it and causing some evaporation of liquid in the lower embedded portion of the container. The latent heat of evaporation is thus transported from the underground (embedded) region to the exposed (radiator) region by this very efficient refluxing process.

The process of evaporation iss, of course, enhanced by the helical wall fin 124 condensate spreader. The complete underground (embedded) container portion acts to remove heat from the surrounding permafrost, and the heat is removed first and most rapidly from wherever the container temperature exceeds the ambient air temperature. That is, heat is removed most rapidly from the warmest part of the underground container portion and the device does not depend upon the entire embedded region being warmer than the ambient air before heat transportation begins.

The tubular container 120 is filled mostly with vapor and is, therefore, very light in weight for ease of handling and installation. Undesirable heat conduction downwards is nearly insignificant during "warm" weather for the structural support assembly 118 because the downward heat conduction (thermal conductivity) in the vapor is very low and the available metal cross section is small. The downward heat conduction is much greater, for example, in a thermo-valve device. The support assembly 118 (heat pipe element) can also function efficiently in nearly a horizontal position for stabilization or support of structure on relatively steep grades whereas a thermo-valve device is very inefficient or cannot function in such position or orientation.

The structural support assembly 118 need be constructed only heavy and sturdy enough to support the intended structure. Large diameters and thick walls for the tubular container 120 are not required for the necessary heat transfer function. The support assembly 118 can be used to support pipe lines, railway trusses, buildings, etc. in the arctic regions. Of course, the support assembly 118 need not be confined to the configuration shown, and can be suitably combined into an architectural design of a building or other structure so as not to be apparent. A number of different working fluids can be individually used efficiently in the support assembly 118. Thus, the materials of construction of the tubular container 120 can be readily selected to meet various soil conditions because a variety of working fluids are available to provide one which is compatable with any chosen tubular container material.

Figures 12, 13:
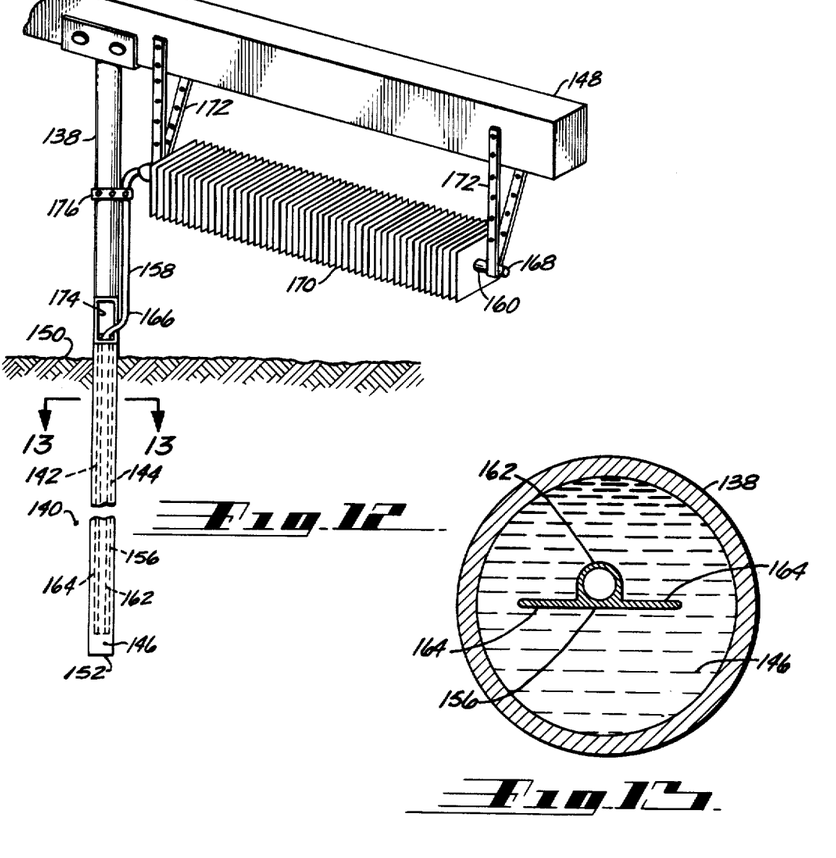
FIG. 12 is a generally perspective view, shown partially in section and in fragments, of a hollow metallic pile installed in permafrost and having the lower portion of a heat pipe element positioned internally of the pile which is filled with a good heat transfer medium.
FIG. 13 is a cross sectional view of a lower part of the hollow metallic pile and heat pipe element installation as taken along the line 13—13 indicated in FIG. 12.

FIG. 12 is a generally perspective view, shown partially in section and in fragmenta, of a hollow metallic pile 138 installed in permafrost 140 and having the lower portion 142 of a heat pipe element 144 positioned internally of the pile which is filled with a good heat transfer medium 146. Beam 148 is part of the structure which is secured to and supported by a number of the piles 138 installed in a permafrost 140 and having respective heat pipe elements 144 positioned therein to stabilize the adjacent permafrost surrounding the piles. The pile 138 is, for example, an iron pipe 4 inches in (inside) diameter with a wall thickness of approximately one-fourth inch. The lower portion 142 of the pile 138 illustratively extends 20 feet below ground surface 150. The pile 138, in this instance, is closed at the bottom by a welded plate 152.

The heat pipe element 144 includes a tubular container 154 having lower, intermediate and upper sections 156, 158 and 160. The lower container section 156 has, for example, a generally cylindrical body 162 and two longitudinal, heat transferring and attachment (if necessary), fins or flanges 164 extending laterally therefrom. The lower container section 156 is the lower portion 142 of the heat pipe element 144. The intermediate container section 158 can be a connecting tubing 166 with an inside diameter approximately equal to that of the cylindrical body 162 of the lower container section 156. The lower end of the tubing 166 is welded or otherwise suitably joined to the upper end of the body 162. The lower end of the cylindrical body 162 of the lower container section 156 is, of course, plugged, sealed and covered by a cap (not shown) similar to that in FIG. 3.

The upper container section 160 also has, for example, a cylindrical body 168 and a plurality of thin lateral, heat transferring, fins 170 affixed to and spaced longitudinally along the cylindrical body as shown in FIG. 12. The fins 170 can be illustratively made of aluminum sheets 8 inches square and 0.050 inch thick. The fins 170 can be spaced approximately one-half inch apart and a sufficient number is used to form a stack about 4 feet long. The right end of the cylindrical body 168 is suitably closed and sealed, and the left end thereof is welded or otherwise suitably joined to the upper end of the connecting tubing 166 which can have an inside diameter approximately equal to that of the cylindrical body 168 of the upper container section 160. The ends of the upper container section 160 can be supported by straps 172 suitably fastened to beam 148. The tubing 166 is appropriately bent to connect with the upper container section 160 (which is thus the upper radiator portion of the heat pipe element 144), and the lower container section 156 through opening 174 provided in the pile 138. The connecting tubing 166 can be secured to pile 138 by any suitable means such as strap 176.

FIG. 13 is a cross sectional view of a lower part of the hollow metallic pile 138 and heat pipe element 144 installation as taken along the line 13—13 indicated in FIG. 12. The pile 138 is filled with a good heat transfer medium 146 which can be kerosene, for example, when the pile is closed at the bottom by a welded plate 152 (FIG. 12). If the pile 138 is open at the bottom and is installed in permafrost 140, the pile can be filled with a slurry of soil and water or sand and water as a suitable heat transfer medium 146. The lower container section 156 is, for example, an aluminum extrusion of necessary length and having a cross sectional configuration as illustrated. The lower container section 156 can be similar to the extrusion 42 shown in FIG. 2.

The fins or flanges 164 of the lower container section 156 have an overall width from tip to tip of 2⅜ inches and a thickness of one-sixteenth inch, and the generally cylindrical body 162 has an inside diameter of one-half inch and a wall thickness of basically one-sixteenth inch, for example. A larger cylindrical body 162 containing more working fluid would, of course, be required if the fins or flanges 162 were deleted or not provided. Also, it may be noted that where the pile 138 is made of iron and the lower container section 156 is made of aluminum, the use of a water in any combination for the heat transfer medium 146 (as in a slurry of soil and water) can lead to an unacceptable level of galvanic action between the aluminum and iron materials unless suitable corrosion control techniques are utilized. Kerosene, however, presented an acceptable solution as the heat transfer medium 146 where an aluminum lower container section 156 was used in an iron pile 138. The expansion of water on freezing might, of course, further cause rupture of the pile 138 if sufficient expansion space is not provided therein.

Figure 14:
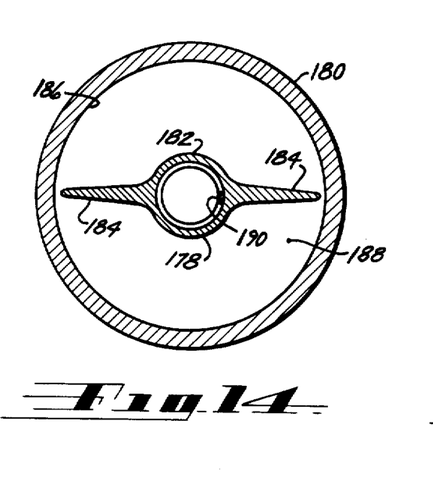
FIG. 14 is a cross sectional view similar to that of FIG. 13 and showing a variation in cross sectional configuration of the heat pipe element to provide a general shape for a double finned element which is near optimum from a heat transfer surface and element flexibility standpoint.

FIG. 14 is a cross sectional view similar to that of FIG. 13 but showing a variation in cross sectional configuration for the lower container section 156 of the heat pipe element 144 to provide a general shape for a double finned element 178 installed in pile 180 and which is near optimum from a heat transfer surface and element flexibility standpoint. It can be seen that the generally cylindrical body 182 has been increased in inner diameter size and the fins 184 taper radially outward an increased distance. Heat transfer efficiency between the working fluid in the body 182 and the inner wall 186 thereof is increased with the increase in inner diameter size of the body, and heat transfer between the body 182 and the heat transfer medium 188 is made more efficient as the outside surface area of the body and fins 184 is increased. Unless the surface area of the element 178 (including body 182 and fins 184) is usually small or of an unusual configuration, the change in heat transfer is essentially proportional to the change in surface area.

Heat transfer efficiency between the working fluid inthe body 182 and the inner wall 186 thereof can be further increased by the use of a suitable flow or wick means 190 installed in the body to direct and distribute working fluid condensate return flow therein. The flow means 190 can, for example, be a helically coiled, small diameter, wire installed longitudinally in the body 182 to assume the arrangement and position therein similarly as the helical wall fin 124 of FIG. 9. While the double finned element 178 configuration has somewhat improved heat transfer efficiency over that of the lower container section 156 configuration shown in FIG. 13, the latter configuration is fully adequate in virtually all situations.

In addition, the broad flat surfaces provided by the fins or flanges 164 tangentially joined at the body 162 are useful for attaching the section 156 to flat or cylindrical surfaces. The lower container section 156 can be easily inserted and installed in the pile 138 or in a longitudinal pocket thereof. By helically coiling the section 156 so that the broad flat surfaces of the fins or flanges 164 lie on a cylindrical surface, the coiled section can be readily slipped on and installed concentrically about cylindrical core structure in an annular space, for example, which is then filled with a suitable heat transfer medium.

Figure 15:
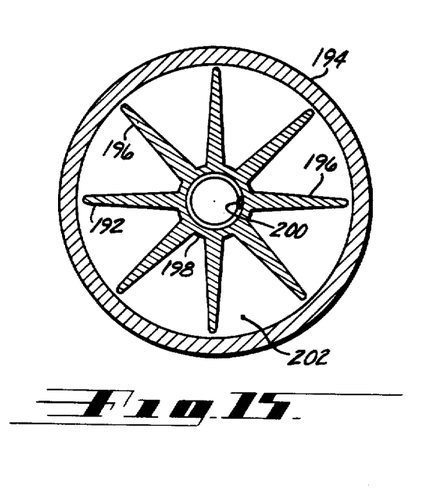
FIG. 15 is another cross sectional view similar to those of FIGS. 13 and 14 and showing another variation in cross sectional configuration of the heat pipe element to provide a general shape which has a greatly increased heat transfer surface over that of a central tubular element alone or with double fins but which, however, cannot be bent as easily or to the extent of such others.

FIG. 15 is another cross sectional view similar to those of FIGS. 13 and 14 and showing another variation in cross sectional configuration for the lower container section 156 of the heat pipe element 144 to provide a general shape for a multiple finned element 192 installed in pile 194. The element 192 has, for example, eight longitudinal fins 196 affixed equiangularly to the cylindrical body 198 and extending radially therefrom to provide a greatly increased heat transfer surface. The cylindrical body 198 is larger in diameter than the generally cylindrical body 162 of the configuration shown in FIG. 13 and, of course, has a larger chamber therein.

The larger body 198 preferably includes a suitable flow or wick means 200 installed in the body to direct and distribute working fluid condensate return flow therein. Flow means 200 is impractical and unnecessary in the body 198 having an inside diameter of about one-half inch or less but is practical and necessary where the inside diameter is about 1 inch or greater. Where the inside diameter of the body 198 is between ½ to 1 inch, the flow means 200 can be either used or not used according to a weighing of the advantages and disadvantages to be gained therefrom. The pile 194 contains, of course, a suitable heat transfer medium 202.

While certain exemplary embodiments of this invention have been described above and shown in the accompanying drawings, it is to be understood that such embodiments are merely illustrative of, and not restrictive on, the broad invention and that I do not desire to be limited in my invention to the details of construction or arrangements shown and described, for obvious modifications may occur to persons skilled in the art.

I claim:

1. For use in ground areas subject to an annual freeze-thaw cycle, a structural support assembly comprising:

a support structure for installation in generally frozen soil, said support structure being made of a heat conducting material, and including an accommodation space therein;

a heat pipe element of a configuration and dispositionn complementary to said support structure, said heat pipe element including a tubular container having a relatively small amount of working fluid therein, the lower portion of said container being installed in said accommodation space, and the lower portion of said support structure being installed in said frozen soil;

a heat exchanger coupled to the upper portion of said container, the intermediate portion of said container connecting said lower container portion to said upper container portion, and said heat exchanger having a configuration and geometry compatible with and complementary to the available space and environmental conditions about said support structure; and a heat transfer medium provided in said accommodation space whereby heat from said fozen soil adjacent to said lower portion of said support structure is transferred by said heat transfer medium to said lower container portion and transported by vaporization of part of said working fluid to said upper container portion and disposed of by condensation of said vaporized working fluid in said heat exchanger to stabilize said frozen soil adjacent to said lower portion of said support structure normally throughout the year.

2. The invention as defined in claim 1 wherein said lower container portion is generally disposed vertically, said upper container portion is generally disposed angularly beneath a low clearance structure, and said heat exchanger includes a passive radiator comprising a plurality of thin, lateral, heat transferring fins affixed to and spaced lonitudinally along said upper container portion whereby said lateral radiator fins are oriented under said structure to provide clear and substantially uniform passage of cooling air between said radiator fins such that a large radiator fin area can be effectively contacted by said air.

3. The invention as defined in claim 2 wherein said heat transfer medium includes a heat transfer mixture of soil and water.

4. The invention as defined in claim 2 wherein said container comprises a generally cylindrical tube having a largely circular cross section, and a plurality of longitudinal fins extending laterally from the lower portion of said tube.

5. The invention as defined in claim 2 wherein said accommodation space is closed at its lower end and said heat transfer medium includes a heat transfer fluid which is normally liquid.

6. The invention as defined in claim 4 wherein said container further comprises flow means for generally directing and spreading condensate flow in said lower tube portion, said flow means being provided on the internal wall surface of said lower tube portion.

7. The invention as defined in claim 5 wherein said container comprises a generally cylindrical tube having a substantially circular cross section, and a plurality of longitudinal fins extending radially and symmetrically from the lower portion of said tube.

* * * * *